United States Patent [19]

Richardson

[11] 4,081,390
[45] Mar. 28, 1978

[54] VISCOSITY INDEX IMPROVER COMPOSITION

[75] Inventor: Adrian Richardson, Hull, England

[73] Assignee: Orobis Limited, London, England

[21] Appl. No.: 683,727

[22] Filed: May 6, 1976

[30] Foreign Application Priority Data

May 22, 1975 United Kingdom ............... 22400/75
Dec. 5, 1975 United Kingdom ............... 49994/75

[51] Int. Cl.$^2$ ............................................. C10M 1/16
[52] U.S. Cl. .................................................. 252/59
[58] Field of Search .......................................... 252/59

[56] References Cited

U.S. PATENT DOCUMENTS

| | | | |
|---|---|---|---|
| 2,697,694 | 12/1954 | Shalit et al. | 252/59 |
| 2,996,455 | 8/1961 | Brown et al. | 252/59 |
| 3,554,911 | 1/1971 | Schiff et al. | 252/59 |
| 3,630,905 | 12/1971 | Sorgo | 252/59 X |
| 3,668,125 | 6/1972 | Anderson | 252/59 |
| 3,775,329 | 11/1973 | Eckert | 252/59 |
| 3,793,200 | 2/1974 | Billings | 252/59 X |
| 3,965,019 | 6/1976 | St. Clair et al. | 252/59 |
| 3,994,815 | 11/1976 | Coleman | 252/59 X |

*Primary Examiner*—Delbert E. Gantz
*Assistant Examiner*—Andrew H. Metz
*Attorney, Agent, or Firm*—Brooks, Haidt, Haffner & Delahunty

[57] ABSTRACT

A composition suitable as a V.I. improver additive for lubricants comprising from 1 to 15% of a vinyl aromatic sequential block copolymer having an $\overline{M}_n$ in the range 25,000 to 125,000 and containing from 10 to 40% b.w. of the vinyl aromatic component, from 5 to 45% of a polybutene having an $\overline{M}_n$ in the range 5,000 to 60,000 and the remainder of the composition comprising a solvent neutral base oil, all percentages being by weight.

10 Claims, No Drawings

VISCOSITY INDEX IMPROVER COMPOSITION

The present invention relates to a polymer composition suitable for use as a viscosity index improver additive in lubricant compositions and to a process for the production of such a composition.

Lubricating oils are normally classified in terms of their viscosity at some standard temperature but equally important is a property known as the viscosity index, which is an empirical number giving a measure of the extent to which the viscosity of an oil decreases as the temperature is raised. An oil which satisfies viscosity requirements at both extremes of the temperature range to which it may be subjected is said to have a high "viscosity index". This property can be controlled to some extent by refining, but in recent years the trend has been towards 'multi-grade' oils, of extremely high viscosity index, in which certain polymer compounds which function as viscosity index improvers are added. One such polymer which, because of its extreme resistance to shear, finds ready application as a viscosity index improver is polybutene. Conventionally polybutenes are prepared by the low-temperature cationic polymerisation of a mixture comprising as major constituents butanes, isobutylene and butenes, such as may be found in hydrogenated refinery $C_4$ raffinate streams. Depending on molecular weight the product polybutenes vary in form from mobile liquids with little tackiness to very viscous liquids with a high degree of tackiness. Being long chain hydrophobic molecules with methyl group side chains polybutenes are readily soluble in hydrocarbons. For ease of handling, transportation and formulation of lubricant compositions it is customary for the higher molecular weight polybutenes to be marketed as solutions in neutral base oils. Another class of additive commonly used as a viscosity index improver is the copolymer formed from a vinyl aromatic monomer and a conjugated diene monomer e.g. styrene/butadiene and styrene/isoprene copolymers. Whilst it is possible to dissolve these copolymers at elevated temperatures in neutral oils at concentrations up to and beyond 15% by weight at elevated temperatures it is often found that the solutions tend to gel on cooling to ambient temperatures.

It has now been found that the tendency to gel on cooling a vinyl aromatic/isoprene sequential block copolymer solution in base oil to ambient temperatures is substantially eliminated by incorporating in the base oil a polybutene having a number average molecular weight in the range 5,000 to 60,000 and that resulting composition is useful as a viscosity index improver additive in lubricant compositions.

Thus according to the present invention there is provided a composition suitable for use as a lubricant additive which comprises from 1 to 15% of a vinyl aromatic/isoprene sequential block copolymer having a number average molecular weight in the range 25,000 to 125,000 and containing from 10 to 40% by weight of the vinyl aromatic component, from 5 to 45% of a polybutene having a number average molecular weight in the range 5,000 to 60,000 and the remainder of the composition comprising a solvent neutral base oil; the percentages of vinyl aromatic/isoprene copolymer, polybutene and base oil being expressed as weight percentages based on the total weight of the composition.

A preferred composition comprises from 2.5 to 10% of a vinyl aromatic/isoprene sequential block copolymer having a number average molecular weight in the range 50,000 to 100,000 and containing from 15 to 35% by weight of the vinyl aromatic component, from 10 to 30% of a polybutene having a number average molecular weight in the range 25,000 to 50,000 and the remainder of the composition comprising a solvent neutral base oil; the percentage of copolymer polybutene and base oil being expressed as weight percentages based on the total weight of the composition.

An even more preferred composition comprises from 5 to 10% of a vinyl aromatic/isoprene sequential block copolymer having a molecular weight in the range 50,000 to 100,000 and containing from 20 to 30% by weight of the vinyl aromatic component, from 15 to 25% of the polybutene having a molecular weight in the range 30,000 to 42,000 and the remainder of the composition comprising a solvent neutral base oil; the percentages of copolymer, polybutene and base oil being expressed as weight percentages based on the total weight of the composition.

The term sequential block copolymer is well-known in the art but to avoid confusion the term vinyl aromatic/isoprene sequential block copolymer when used in this specification means a copolymer formed from a vinyl aromatic monomer and isoprene monomer in which the respective monomers are present in the individual polymer chains in distinct homopolymeric blocks. Thus if A represents a molecule of a vinyl aromatic monomer and B a molecule of isoprene the sequential block copolymers encompassed by the present invention have the essential chain structure:

A-A-A-A-A-A-B-B-B-B-B-B-B-B-B-     (A)

A-A-A-B-B-B-B-B-B-B-B-B-A-A-A-     (B)

and include also that type of sequential block copolymer generally referred to in the art as a tapered block copolymer having the chain structure:

A-A-A-B-B-B-B-B-B-A-B-B-A-A-A-     (C)

and

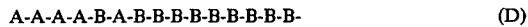
A-A-A-A-B-A-B-B-B-B-B-B-B-B-     (D)

but does not include copolymers known in the art as statistical or alternating copolymers having the chain structures:

A-B-A-B-A-B-A-B-A-B-A-B-     (E)

or random copolymers having the chain structure:

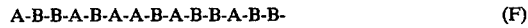
A-B-B-A-B-A-A-B-A-B-B-A-B-B-     (F)

Vinyl aromatic/isoprene sequential block copolymers may be prepared by techniques well-known in the art. The most common technique is that of anionic polymerization, sometimes known as 'living polymerisation' wherein a pre-determined amount of a polymerisation iniator such as an organolithium compound, e.g. n- or sec-butyl lithium, dissolved in a hydrocarbon solvent is added to a pre-determined quantity of the vinyl aromatic monomer, preferably in the presence of a diluent, which diluent may be a hydrocarbon solvent e.g. toluene. After the vinyl aromatic monomer is completely polymerised pure isoprene monomer is added. The non-terminated vinyl aromatic polymer chains initiate polymerisation of the isoprene monomer which adds thereto until the isoprene monomer is consumed. If a block copolymer of structure A is desired polymerisation is then terminated by the addition of a suitable terminating agent, e.g. methanol, of if a polymer of structure B is to be prepared a further amount of the vinyl aromatic monomer is added prior to the termination step. The molecular weight of the block copolymer is dependent on the number of moles of monomer and initiator present. Tapered block copolymers having the chain structure C may be prepared by adding a mixture of vinyl aromatic monomer and isoprene to the non-terminated vinyl aromatic polymer resulting from the addition of an organo lithium initiator to a vinyl aromatic monomer. Using alternative difunctional initiators sequential block copolymers may be synthesised from a central polymer block.

Preferably the vinyl aromatic component of the copolymer is styrene.

Preferably the vinyl aromatic/isoprene copolymers are hydrogenated in order to improve their thermal stability. Suitable methods of hydrogenation are described in U.S. Pat. Nos. 3,113,986 and 3,205,278 in which there is employed as catalyst an organo-transition metal compound and trialkylaluminium (e.g. nickel acetylacetone kor octoate and triethyl or triisobutylaluminium). The process allows more than 95% of the olefinic double bonds and less than 5% of the aromatic nucleus double bonds to be hydrogenated. Alternatively the method described in U.S. Pat. No. 2,864,809 employing a nickel on kieselguhr catalyst may be employed. After hydrogenation the catalyst may be removed by treating the hydrogenated copolymer with a mixture of methanol and hydrochloric acid. The solution so obtained is decanted, washed with water and dried by passage through a column containing a drying agent.

Preferably the vinyl aromatic/isoprene copolymer is Shellvis 50 VI-Improver marketed by Shell Chemicals. Shellvis 50 is a hydrogenated styrene/isoprene sequential block copolymer of number average molecular weight in the range 50,000 to 100,000 and containing about 75% isoprene and 25% styrene, greater than 95% of the isoprene component being present in the 1,4-form in which greater than 95% of the olefinic double bonds are hydrogenated and the styrene component having less than 5% of the aromatic nucleus double bonds hydrogenated.

Polybutenes may be prepared by continuously feeding a refinery butane-butene stream containing butanes, isobutylene, butenes and minor concentrations of $C_3$ and $C_5$ hydrocarbons into a cylindrical agitated reactor maintained at about $-10°$ C and 100 psig in the presence of aluminum chloride as catalyst. The polybutenes in the reactor effluent may be recovered and purified in a series of operations consisting of quenching of the catalyst, washing, settling, filtering, flashing and stripping. A product within a range of molecular weight distribution may be fractionated and the fractions recombined to form the various grades of polybutenes.

Preferably the polybutene is a commercially available polybutene marketed by BP Chemicals International Limited under the trade name Hyvis 7000/45, which is a solution of a polybutene having a number average molecular weight in the range 30,000 to 42,000 in '150 solvent neutral' base oil, the polybutene forming 45% by weight of the solution.

The solvent neutral base oil is suitably a 100 to 150, preferably a 130 to 150 solvent neutral base oil.

According to another aspect of the present invention there is provided a process for the production of a composition as hereinbefore described which process comprises mixing from 1 to 15% of a vinyl aromatic/isoprene sequential block copolymer having a number average molecular weight in the range 25,000 to 125,000 and containing from 10 to 40% by weight of the vinyl aromatic component, at elevated temperature, with a solvent neutral base oil having dissolved therein from 5 to 45% of a polybutene having a number average molecular weight in the range 5,000 to 60,000; the percentages of vinyl aromatic/isoprene copolymer and polybutene being expressed as weight percentages based on the total weight of the composition.

The elevated temperature at which the copolymer is mixed with the base oil may suitably be in the range 50° to 220°, preferably 75° to 200°, even more preferably 120° to 180° C. The mixing is preferably accompanied by agitation of the mixture. Preferably the mixing is effected in an atmosphere of an inert gas such as nitrogen.

According to yet another aspect of the present invention there is provided a lubricant composition comprising a major proportion of a lubricant base oil and a minor proportion of the lubricant additive composition as hereinbefore described.

In addition to the lubricant additive composition hereinbefore described, which is added for the purpose of improving the viscosity index of the lubricant base oil, the lubricant composition may contain other additives known to persons skilled in the art such as corrosion inhibitors, detergents, dispersants, anti-wear agents etc.

The invention will be illustrated with reference to the following Examples

COMPARISON TEST 1

Hyvis 7000/45* was used to dissolve a number of conventional VI improver additives at a temperature above 100° C and the solutions cooled to ambient temperature with the following results:
 (i) 25% Hyvis 7000/45:75% Shell Slurry**
   Polymer separates out on cooling
 (ii) 45% Hyvis 7000/45:55% Shell Slurry
   Polymer separates out on cooling and the whole mixture almost solidifies.
 (iii) 45% Hyvis 7000/45:55% Viscoplex 6-50***
   Polymer separates out on cooling
 (iv) 55% Hyvis 7000/45:45% ECA 5792****
   Polymer separates out on cooling
 (v) 80% Hyvis 05*****:20% solid Lubad 125
   Polymer separates out of solution on cooling
 (vi) Hyvis 7000/45:solid Lubad 125
   Lubad 125 insoluble at all levels All percentages are weight percentages based on the total weight of the composition

* Hyvis 7000/45 is a solution of polybutene having an $\overline{M}n$ in the range 30,000 to 42,000 in '150 solvent neutral' base oil, the polybutene forming 45% by weight of the solution. Hyvis 7000/45 is marketed by BPCIL.
** Shell Slurry (Lubad 125 soln) is a styrene/butadiene copolymer.
*** Viscoplex 6-50 is a dispersant type methacrylate ester polymer available from Rohm Darmstadt.
**** ECA 5792 is an olefin copolymer available from Esso Chemicals/Paramins.
***** Hyvis 05 is a polybutene having a number average molecular weight of 360 manufactured and marketed by BPCIL.

EXAMPLE 1

Shellvis 50+ was dissolved in Hyvis 7000/45 by mixing the two at a temperature above 100° C with stirring. The solution was cooled to room temperature without any polymer separating and its viscosity at 210° F was measured with the following results:
(i) 95% Hyvis 7000/45:5% Shellvis 50
  Viscosity at 210° F = 2075 cs
(ii) 90% Hyvis 7000/45:10% Shellvis 50
  Viscosity at 210° F = 4600 cs
The viscosity of Hyvis 7000/45 in the absence of any polymeric additive was 900 cs.

† Shellvis 50 is a hydrogenated styrene/isoprene copolymer containing about 25% by weight styrene and 75% by weight isoprene and having an $\overline{Mn}$ in the range 50,000 to 100,000. The isoprene component is greater than 95% in the 1,4-form and the olefinic double bonds are greater than 95% hydrogenated. Shellvis 50 is commercially available from Shell Chemicals Limited.

COMPARISON TEST 2

Shellvis 50 was dissolved in 150SN oil by mixing the two at a temperature above 100° C with stirring and the solutions cooled to ambient temperature with the following results:
5% Shellvis 50 : 95% 150SN oil
  A highly viscous but nevertheless mobile solution.
10% Shellvis 50 : 90% 150SN oil
  An immobile jelly.
All percentages are percentages by weight based on the total weight of the composition.

EXAMPLE 2

(a) Preparation of VI improver composition

Shellvis 50 was dissolved in Hyvis 7000/45 diluted with further 150SN oil with stirring at a temperature of 120° C in an atmosphere of nitrogen to produce a solution of the following composition:
37.5% 150SN oil
6.6% Shellvis 50
55.9% Hyvis 7000/45
all percentages being by weight, based on the total weight of the composition.

(b) Typical VI characteristics of Shellvis/Hyvis mixtures (i) 15W50

15% of the composition described in (a) above was blended in LP 501 (150SN) as base oil containing an additive package.* The viscosity data was measured with the following results:
  $Vis_{210}° F = 17.8$
  $V_0° F = 50$
  VIE = 155
VIE of the LP501 containing the additive package alone = 100

(ii) 20W50

15% of the composition described in (a) above was blended with an 80/20 mixture of LP501 (150SN)/C160(500SN) as base oil containing an additive package.* The viscosity data was measured as follows:
  $V_{210}° F = 19.4$
  $V_0° F = 70$
  VIE = 150
VIE of the 80/20 LP501/C160 mixture containing the additive package = 105.

(iii) 10W30

8% of the composition described in (a) above was blended with an 80/20 mixture of LP501 (150SN)/Lube oil (100SN) as base oil containing an additive package.* Viscosity data was evaluated as follows:
  $V_{210}° F = 10.1$
  $V_0° F = 24$
  VIE = 155
VIE of the 80/20 LP501/Lube oil mixture containing the additive package = 90.

(iv) 10W40

14% of the composition described in (a) above was blended with a 60/40 mixture of lube oil (100SN)/LP501 (150SN) containing an additive package. Viscosity data was evaluated as follows:
  $V_{210}° F = 13.9$
  $V_0° F = 27$
  VIE = 170
VIE of the 60/40 lube oil/LP501 mixture containing the additive package = 70.

* The additive package was a typical mixture of bis succinimide, calcium phenate, calcium sulphonate and zinc phosphorodithioate at a treatment level of 9.8% by weight in the final base oil.

I claim:

1. A composition suitable for use as a lubricant additive which consists of from 1 to 15% of a vinyl aromatic/isoprene sequential block copolymer having a number average molecular weight in the range 25,000 to 125,000 and containing from 10 to 40% by weight of the vinyl aromatic component, from 5 to 45% of a polybutene having a number average molecular weight in the range 5,000 to 60,000 and the remainder of the composition being a solvent neutral base oil; the percentages of vinyl aromatic/isoprene copolymer, polybutene and base oil being expressed as weight percentages based on the total weight of the composition.

2. A composition according to claim 1 which consists of from 2.5 to 10% of a vinyl aromatic/isoprene sequential block copolymer having a number average molecular weight in the range 50,000 to 100,000 and containing from 15 to 35% by weight of the vinyl aromatic component, from 10 to 30% of a polybutene having a number average molecular weight in the range 25,000 to 50,000 and the remainder of the composition being a solvent neutral base oil; the percentages of copolymer, polybutene and base oil being expressed as weight percentages based on the total weight of the composition.

3. A composition according to claim 1 which consists of from 5 to 10% of vinyl aromatic/isoprene sequential block copolymer having a number average molecular weight in the range 50,000 to 100,000 and containing from 20 to 30% by weight of the vinyl aromatic component, from 15 to 25% of a polybutene having a molecular weight in the range 30,000 to 42,000 and the remainder of the composition being a solvent neutral base oil; the percentages of copolymer, polybutene and base oil being expressed as weight percentages based on the total weight of the composition.

4. A composition according to claim 1 wherein the vinyl aromatic component of the sequential block copolymer is styrene.

5. A composition according to claim 1 wherein the vinyl aromatic/isoprene sequential block copolymer is hydrogenated.

6. A composition according to claim 1 wherein the vinyl aromatic/isoprene sequential block copolymer is hydrogenated to the extent that more than 95% of the olefinic double bonds and less than 5% of the aromatic nucleus double bonds are hydrogenated.

7. A composition according to claim 1 wherein the vinyl aromatic/isoprene sequential block copolymer has a number average molecular weight in the range 50,000 to 100,000 and contains about 75% isoprene and about 25% styrene, greater than 95% of the isoprene component being present in the 1,4-form in which greater than 95% of the olefinic double bonds are hydrogenated and the styrene component having less than 5% of the aromatic nucleus double bonds hydrogenated.

8. A composition according to claim 1 wherein the solvent neutral base oil is a 100 to 150 solvent neutral base oil.

9. A composition according to claim 1 wherein the polybutene has a number average molecular weight in the range 30,000 to 42,000 is dissolved in 150 solvent neutral base oil, the polybutene forming 45% by weight of the solution.

10. A lubricant composition consisting of a major proportion of a lubricant base oil and a minor proportion of a composition consisting of from 1 to 15% of a vinyl aromatic/isoprene sequential block copolymer having a number average molecular weight in the range 25,000 to 125,000 and containing from 10 to 40% by weight of the vinyl aromatic component, from 5 to 45% of a polybutene having a number average molecular weight in the range 5,000 to 60,000 and the remainder of the composition being a 100 to 150 solvent neutral base oil; the percentages of vinyl aromatic/isoprene copolymer, polybutene and base oil being expressed as weight percentages based on the total weight of the composition.

* * * * *